United States Patent Office 3,592,949
Patented July 13, 1971

3,592,949
ACYLATED ANILIDE CARBAMATES
Eugene G. Teach, El Cerrito, and Julius J. Menn, Saratoga, Calif., assignors to Stauffer Chemical Company, New York, N.Y.
No Drawing. Filed Mar. 29, 1968, Ser. No. 717,465
Int. Cl. C07c *125/06*
U.S. Cl. 260—479C                14 Claims

ABSTRACT OF THE DISCLOSURE

Compounds corresponding to the formula

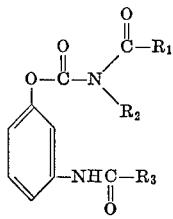

in which $R_1$ and $R_2$ are independently lower alkyl, halogenated lower alkyl, lower alkenyl, cycloalkyl, phenyl, substituted phenyl in which the substituents are nitro, halogen, lower alkyl or lower alkoxy and $R_3$ is hydrogen, lower alkyl, cycloalkyl, halogenated lower alkyl, lower alkenyl, furyl or benzyl. The above-defined compounds are effective as herbicides, insecticides and animal parasiticides, especially as anthelminthics. Representative compounds are: 3' - (N - methyl - N - acetylcarbamoyloxy) formanilide; 3' - N - isopropyl - N - trifluoroacetylcarbamoyloxy propionanilide; 3' - N - butyl - N - trifluoroacetylcarbamoloxypropionanilide; 3' - (N - isobutyryl-N - isopropylcarbamoyloxy) propionanilide; 3' - (N - i-propyl - N - chloroacetyl - carbamoyloxy) propionanilide.

---

This invention relates to certain new compounds and the use of such compounds as herbicidal substances, insecticides and as animal parasiticides, especially as anthelminthics. More specifically, this invention relates to certain acylated anilide carbamates and their utility as herbicides, insecticides and anthelminthics.

The novel compounds of the present invention correspond to the general formula

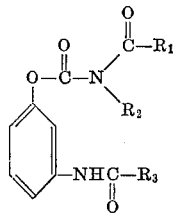

in which $R_1$ and $R_2$ are independently selected from the group consisting of lower alkyl, halogenated lower alkyl, lower alkenyl, cycloalkyl, phenyl, substituted phenyl in which the substituents are nitro, halogen, lower alkyl or lower alkoxy and $R_3$ is selected from the group consisting of hydrogen, lower alkyl, cycloalkyl, halogenated lower alkyl, lower alkenyl, furyl and benzyl.

The terms ower alkyl and lower alkoxy, as employed herein, preferably include those members of the groups which contain from 1 to 6 carbon atoms, inclusive, in both straight chain and branched chain configurations. Examples of such groups are methyl, ethyl, n-propyl, isopropyl, butyl, sec-butyl, n-hexyl, and iso-amyl. When lower alkyl and lower alkoxy are substituents in substituted phenyl, these terms preferably include those members which contain from 1 to 4 carbon atoms, inclusive, in both straight chain and branched configurations. The term cycloalkyl preferably includes members of the group having from 3 to 6 carbon atoms, inclusive, for example, cyclopropyl, cyclobutyl, cyclopentyl and cyclohexyl. The term lower alkenyl preferably includes those members of the group containing at least one double bond and containing from 2 to 4 carbon atoms, inclusive, for example vinyl, allyl and butenyl. By the term halogenated lower alkyl preferably includes fluorine, chlorine and bromine substituted lower alkyl groups as defined above, for example, trifluoromethyl, trichloromethyl, monochloromethyl, fluoroethyl, chloroethyl, dichloropropyl, dibromoethyl, dibromopropyl, trifluorobutyl, monobromo butyl, monochloro-n-hexyl and fluorochloro-n-hexyl.

The compounds of the present invention are prepared by reacting an appropriate N-mono-substituted carbamoyloxy substituted-anilide with the appropriate acid anhydride or acyl chloride. The reaction proceeds readily in the liquid phase, the employment of a solvent is also useful, facilitating processing, as well as agitation of the reactants. An inert organic solvent, e.g. chloroform, ether, dioxane, tetrahydrofuran, toluene, benzene is preferably employed as a reaction medium. It is preferred to carry out the reaction of an anhydride and the above-mentioned N - mono - substituted carbamoyloxy substituted-anilide in the presence of an acidic catalyst, such as sulfuric acid. Preferably, a temperature is employed in these reactions that permits operation in the liquid phase and which is between room temperature and reflux temperature of the solvent, if one is used. The compounds of this invention are recovered from the mixture and purified by standard procedures.

Compounds of the present invention are prepared in accordance with the following illustrative examples:

EXAMPLE I

Preparation of 3'(N-methyl-N-acetyl carbamoyloxy) propionanilide

Thirteen and three-tenths grams, 0.06 mole, of 3'-(N-methyl carbamoyloxy) propionanilide is added to sulfuric acid. The mixture is heated at reflux for 30 minutes and the sulfuric acid neutralized with 1 to 2 g. of sodium acetate. The excess acetic anhydride is distilled off under vacuum and the residue taken up in methylene chloride, washed with 5% NaOH, 5% HCl and water and dried over an hydrous magnesium sulfate. The methylene chloride is removed under vacuum and the liquid residue slowly solidified. The product was triturated with ether and dried, giving 10.6 g. of the title compound, M.P. 93–97° C.

EXAMPLE II

Preparation of 3'-(N-isopropyl-N-trichloroacetyl carbamoyloxy) propionanilide

Twelve and five-tenths grams, 0.05 mole, of 3'(N-isopropyl carbamoyloxy) propionanilide is added to 50 ml. of toluene containing 10 g. of trichloroacetyl chloride. The mixture was heated at reflux for 20 hours until all HCl fumes had stopped coming over. The mixture is cooled and the fluffy solid filtered off, washed with petroleum ether and dried. The yield of title compound is 50 g. of solid, M.P. 185–192° C. Submitted for analysis for chlorine, the theory is 27% and 27.5% was found.

EXAMPLE III

Preparation of 3'(N-isopropyl-N-chloroacetyl carbamoyloxy) propionanilide

Fifteen grams, 0.6 mole, of 3'(N-isopropyl-carbamoyloxy) propionanilide is added to 50 ml. of benzene containing 20 g. of chloracetic anhydride and two drops of sulfuric acid. The mixture is heated at reflux for two hours until clear and is allowed to stand overnight. The trace of solid material is filtered off and the mixture is washed with 5% NaOH and water and dried over magnesium sulfate and the benzene removed under vacuum. The yield is 13.2 g. of the title compound, $n_D^{30}$ 1.5310.

EXAMPLE IV

Preparation of 3′(N-isopropyl-N-trifluoroacetyl carbamoyloxy) propionanilide

Twelve and five-tenths grams, 0.05 mole, of 3′(N-isopropyl carbamoyloxy) propionanilide is added to 40 g. of trifluoroacetic anhydride containing one drop of sulfuric acid and the mixture heated at reflux for 30 minutes. The sulfuric acid is neutralized with approximately 1 g. of sodium acetate and the excess trifluoro acetic anhydride and trifluoro acetic acid is removed under vaccuum. The residue is taken up in methylene chloride and washed with 5% NaOH and water and dried over anhydrous magnesium sulfate. The methylene chloride is removed under vacuum. There is obtained 11 g. of the title compond, a liquid $n_D^{30}$ 1.4799.

The following is a table of the compounds which are prepared according to the aforedescribed procedures. Compound numbers have been assigned to them and are substituted for identification throughout the balance of the specification.

TABLE I

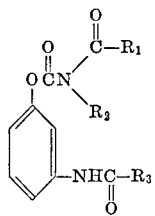

| Compound number | $R_1$ | $R_2$ | $R_3$ | M.P., °C. or $n_D^{30}$ |
|---|---|---|---|---|
| 1 | Methyl | Methyl | Hydrogen | 1.5416 |
| 2 | do | do | Ethyl | 93–97° |
| 3 | do | n-Butyl | do | 1.5125 |
| 4 | do | Iso-propyl | do | 1.5114 |
| 5 | Trifluoromethyl | do | do | 1.4799 |
| 6 | do | n-Butyl | do | 134–137° |
| 7 | do | Methyl | do | 150–153° |
| 8 | Chloromethyl | Isopropyl | do | 1.5310 |
| 9 | Trichloromethyl | do | do | 185–192° |
| 10 | Isopropyl | do | do | 156–158° (dec.) |
| 11 | Allyl | Allyl | Vinyl | |
| 12 | do | do | Cyclopropyl | |
| 13 | Cyclopropyl | n-Butyl | Vinyl | |
| 14 | n-Butyl | do | 1-chloroethyl | |
| 15 | Trifluoromethyl | Cyclohexyl | Vinyl | |
| 16 | Chloromethyl | do | 2-methylvinyl | |
| 17 | Phenyl | do | Cyclopropyl | |
| 18 | Cyclohexyl | Ethyl | 2-furyl | |
| 19 | 3-chlorophenyl | Allyl | do | |
| 20 | Methyl | n-Butyl | do | |
| 21 | Phenyl | 3-chlorophenyl | 2-methylvinyl | |
| 22 | Trifluoromethyl | do | Cyclopropyl | |
| 23 | Methyl | n-Propyl | Cyclobutyl | |
| 24 | do | Cyclohexyl | 2-furyl | |
| 25 | Ethyl | Phenyl | 2-methylvinyl | |
| 26 | i-Propyl | do | Cyclopropyl | |
| 27 | Methyl | do | 2-furyl | |
| 28 | Allyl | Allyl | Ethyl | |
| 29 | Trifluoromethyl | Methyl | Benzyl | |
| 30 | Phenyl | Phenyl | do | |
| 31 | Isopropyl | 3-nitrophenyl | Ethyl | |
| 32 | Phenyl | 2-chloroethyl | Benzyl | |
| 33 | Methyl | 4-methoxyphenyl | Isopropyl | |
| 34 | Trifluoromethyl | m-Tolyl | Hydrogen | |
| 35 | Ethyl | m-Toyl | Benzyl | |
| 36 | m-Toyl | Allyl | Allyl | |
| 37 | Methyl | Phenyl | 3-chloropropyl | |
| 38 | do | Cyclohexyl | Benzyl | |
| 39 | n-Butyl | 3-fluorophenyl | Hydrogen | |
| 40 | Trifluoromethyl | Iso-amyl | 2-furyl | |

HERBICIDAL SCREENING TESTS

As previously mentioned, the herein described compounds produced in the above-described manner are phytotoxic compounds which are useful and valuable in controlling various plant species. Compounds of this invention are tested as herbicides in the following manner.

Pre-emergence herbicide test

On the day preceding treatment, seeds of seven different weed species are planted in dividual rows using one species per row across the width of the flat. The seeds used are hairy crabgrass (*Digitaria sanguinalis* (L.) Scop.), yellow foxtail (*Setaria glauca* (L.) Beauv.), watergrass (*Echinochloa crusgalli* (L.) Beauv.), California red oat (*Avena sativa* (L.)), redroot pigweed (*Amaranthus retroflexus* (L.)), Indian mustard (*Brassica juncea* (L.) Coss.) and curly dock (*Rumex crispus* (L.)). Ample seeds are planted to give about 20 to 50 seedlings per row, after emergence, depending on the size of the plants. The flats are watered after planting. The spraying solution is prepared by dissolving 50 mg. of the test compound in 3 ml. of a solvent such as acetone containing 1% Tween 20® (polyoxyethylene sorbitan monolaurate) and diluting with a small amount of water. The following day each flat is sprayed at the rate of 20 pounds of the candidate compound per 80 gallons of solution per acre. An atomizer is used to spray the solution on soil surface. The flats are placed in a greenhouse at 80° F. and watered regularly. Two weeks later the degree of weed control is determined by comparing the amount of germination and growth of each weed in the treated flats with weeds in several untreated control flats. The rating system is as follows:

−+ = no significant injury (0–15 percent control)
+ = slight injury (25–35 percent control)
++ = moderate injury (55–65 percent control)
+++ = severe injury or death (85–100 percent control).

An activity index is used to represent the total activity on all seven weed species. It is the sum of the number of plus marks, so that an activity index of 21 represents complete control of all seven weeds. The results of this test are reported in Table II.

Post-emergence herbicide test

Seeds of five weed species including hairy crabgrass, watergrass, California red oats, Indian mustard, and curly dock and one crop, pinto beans (*Phaseolus vulgaris*), are planted in flats as described above for pre-emergence screening. The flats are placed in the greenhouse at 72–85° F. and watered daily with a sprinkler. About 10 to 14 days after planting when the primary leaves of the bean plant are almost fully expanded and the first trifoliate leaves are just starting to form, the plants are sprayed. The spray is prepared by weighing out 50 mg. of the test compound, dissolving it in 5 ml. of acetone containing 1% Tween 20® (polyoxyethylene sorbitan monolaurate) and then adding 5 ml. of water. The solution is sprayed on the foliage using an atomizer. The spray concentration is 0.5% and the rate would be approximately 20 lb./acre if all of the spray were retained on the plant and the soil, but some spray is lost so it is estimated that the application rate is approximately 12.5 lb./acre.

Beans are used to detect defoliants and plant growth regulators. The beans are trimmed to two or three plants per flat by cutting off the excess weaker plants several days before treatment. The treated plants are placed back in the greenhouse and care is taken to avoid sprinkling the treated foliage with water for three days after treatment. Water is applied to the soil by means of a slow stream from a watering hose taking care not to wet the foliage.

Injury rates are recorded 14 days after treatment. The rating system is the same as described above for the pre-emergence test where (−), (+), (++), and (+++) are used for the different rates of injury and control. The injury symptoms are also recorded. The maximum activity index for complete control of all the species in the post-emergence screening test is 18 which represents the sum of the plus marks obtained with the six plant species used in the test. The herbicide activity index is shown in Table II.

TABLE II.—HERBICIDAL ACTIVITY SCREENING RESULTS

| Compound number | Pre-emergence (20 lb./a.) | Post-emergence (12.5 lb./a.) |
| --- | --- | --- |
| 1 |  | 6 |
| 2 | 1 | 6 |
| 3 | 21 | 18 |
| 4 | 21 | 18 |
| 5 | 21 | 18 |
| 6 | 21 | 18 |
| 7 | 21 | 18 |
| 8 | 17 | 18 |
| 9 | 17 | 18 |
| 10 | 19 | 18 |

The compounds of the present invention are used as pre-emergence or post-emergence herbicides and are applied in a variety of ways at various concentrations. In practice the compounds are formulated with an inert carrier, utilizing methods well known to those skilled in the art, thereby making them suitable for application as dusts, sprays, or drenches and the like in the form and manner required. The mixtures can be dispersed in water with the aid of a wetting agent or they can be employed in organic liquid compositions, oil and water, water in oil emulsions, with or without the addition of wetting, dispersing or emulsifying agents. The amount applied depends upon the nature of the seeds or plants to be controlled and the rate of application varies from 1 to approximately 50 pounds per acre.

The phytotoxic compositions of this invention are applied to the plants in the conventional manner. Thus, the dust and liquid compositions can be applied to the plant by the use of power-dusters, boom and hand sprayers and spray-dusters. The compositions can also be applied from airplanes as a dust or a spray because they are effective in very low dosages. In order to modify or control growth of germinating seeds or emerging seedlings, the dust and liquid compositions are applied to the soil according to conventional methods and are preferably distributed in the soil to a depth of at least ½-inch below the soil surface. It is not necessary that the phytotoxic compositions be admixed with the soil particles and these compositions can be applied merely by spraying or sprinkling the surface of the soil. The phytotoxic compositions of this invention can also be applied by addition to irrigation water supplied to the field to be treated. This method of application permits the penetration of the compositions into the soil as the water is absorbed therein. Dust compositions, granular compositions or liquid formulations applied on the surface of the soil can be distributed below the surface of the soil by conventional means such as discing, dragging or mixing operations.

The phytotoxic compositions of this invention can also contain other additaments, for example fertilizers, pesticides and the like, used as adjuvant or in combination with any of the above-described adjuvants. Phytotoxicants useful in combination with the above-described compounds include for example 2,4 - dichlorophenoxyacetic acids, 2,4,5 - trichlorophenoxyacetic acid, 2 - methyl - 4 - chlorophenoxyacetic acid and the salts, esters and amides thereof; triazine derivatives, such as 2,4-bis(3-methoxy-propylamino) - 6 - methylthio-S-triazine; 2 - chloro - 4-ethyl-amino - 6 - isopropylamino-S-triazine, and 2 - ethylamino-4 - isopropylamino - 6 - methylmercapto - S - triazine; urea derivatives, such as 3-(3,4-dichlorophenyl)-1,1-dimethyl urea and 3 - (p-chlorophenyl) - 1,1 - dimethyl urea, and acetamides such as N,N-diallyl-a-chloroacetamide, N-(a-chloroacetyl)hexamethylene imine, and N,N-diethyl-a-bromoacetamide, and the like; benzoic acids such as 3- amino-2,5-dichlorobenzoic and; thiocarbamates, such as S-propyl dipropylthiocarbamate; S-ethyl-dipropyl-thiocarbamate, S-ethyl-cyclohexylethylthiocarbamate, S-ethyl hexahydro - 1H - azepine - 1 - carbothioate and the like. Fertilizers useful in combination with the active ingredients include for example ammonium nitrate, urea and superphosphate. Other useful additaments include materials in which plant organisms take root and grow such as compost, manure, humus, sand and the like.

Insecticidal evaluation tests

The following procedure is used to test houseflies in an evaluation test for insecticidal activity. A stock solution containing 100 µg./ml. of the toxicant in an appropriate solvent is prepared. Aliquots of this solution are combined with 1 milliliter of an acetone-peanut oil solution in a glass Petri dish and allowed to dry. The aliquots are employed to achieve desired toxicant concentration ranging from 100 µg. per Petri dish to that at which 50% mortality was attained. The Petri dishes are placed in a circular cardboard cage, closed on the bottom with cellopane and covered on top with cloth netting. Twenty-five female houseflies are introduced into the cage and the percent mortality is recorded after 48 hours. The LD–50 values are expressed in terms of µg. per 25 female flies. Compound number 7 exhibits an LD–50 of 5 µg./25 female flies, compound number 1 exhibits an LD–50 of 30 µg./25 female flies and compound number 2 an LD–50 of 35 µg./25 female flies.

Helminth screen test

Infections known as helminthiasis involve infectation of the animal body and particularly the gastro-intestinal tract with various species of parasitic worms. It is a very widespread and serious disease and the known methods available for its treatment and prevention are not always satisfactory. The present invention includes an improved chemotherapeutic method for combating animal parasites which cause helminthic infections Preliminary evaluation of oral efficacy and safety of continuously administering the candidate compounds is conducted in mice employing the following helminth infections:

*Nematospiroides dubious* (Nd)
*Nippostrongylus brasiliensis* (syn. *N. muris*) (Nm)
*Hymenolepis nana* (Hn)
*Syphacia obvelata* (So)
*Aspiculuris tetraptera* (At)

Young Swiss-Webster or Swiss Albino mice are used as the host animals. The mice are put on medicated rations 1 to 3 days prior to inducing infections. The host animals are continued on the medication for 21 to 28 days in order to detect activity against the various developmental stages of the test helminths. All mice are weighed and allotted to groups of two or more mice per group so that the total weight and weight variations are approximately equal for each group. All groups are fed a rat-mouse mash died ad lib. Drinking water is supplied ad lib. in drip bottles.

The candidate compounds aer weighed, premixed with powdered feed and premixed by hand while adding the medications as required to the previously weighed amount of mash diet. The medicated feeds are then mixed in a mechanical blender to insure thorough mixing. Since observation of helminth parasites in necropsied animals is facilitated by the absence of food from the small intestine, a 1–6 hour starvation period is imposed just prior to sacrifice of the survivors.

Infective dosages to be administered to each test animal are made up as follows:

(Hn) eggs, average 185 eggs/dose, (Nd) larvae, 20 to 59 larvae per dose, (So), average 64 ova/dose and (At) average 52 ovo/dose suspended in 0.05 to 0.1% tragacanth.

This mixture of four species is quantitated and the volume adjusted to 0.1 to 0.2 ml. per mouse to be infected. Infection is orally administered to the test animals with a blunt needle.

The (Nm) larvae are administered subcutaneously 3 to 7 days before termination of the test.

All mice found dead sufficiently intact during the test period are necropsied as soon as possible and the larvae or mature parasites counted. Between the 21st and 28th day all surviving mice are sacrificed and the contents of their intestines and ceca examined microscopically for parasites. The number of parasites found is recorded for comparison with the comparably exposed unmedicated groups for efficacy evaluation.

The following table presents a summary of the anthelmintic activity of the compounds of the instant invention in the above-described test. The values are given as percent control of the test helminth at dietary levels in parts per million (p.p.m.).

TABLE III

| Compound number | Dosage, p.p.m. | (Nd) | (Nm) | (Hn) | (So) | (At) |
|---|---|---|---|---|---|---|
| 1 | 1,000 | 100 | | | | 99 |
| 3 | 1,000 | 62 | | | | 63 |
| 4 | 1,000 | 11 | 100 | 23 | 71 | 65 |
| 5 | 500 | 47 | 54 | | 49 | |
| 8 | 1,000 | | 67 | 100 | | 56 |
| 9 | 1,000 | | 61 | | 24 | 32 |
| 10 | 1,000 | | 11 | 69 | 95 | 62 |

The compounds of the present invention are used as effective anthelminthic agents and are applied in a variety of ways at various concentrations. In practice the compounds are formulated with an inert adjuvant utilizing methods well known to those skilled in the art. The amount applied will depend upon the nature of the particular utility desired. The rate of application varies with the anthelminthic use intended. In treating domesticated animals the compounds are mixed with a non-toxic edible carrier to form a feed supplement which is then incorporated in the animal feed in the desired concentration, or they are administered in unit dosage forms which may take the form of a capsule, bolus, tablet, a liquid drench, an oil or injection. Actually any of the methods now used or available for treating animals infected with or susceptible to such animal parasitic infections are satisfactory. The unit dosage formulations are prepared by distributing the desired amount of anthelminthic in a pharmaceutically accepted vehicle.

The concentration of a compound of the present invention, constituting an effective amount in best mode of administration in the utility disclosed is readily determinable by those skilled in the art. Various changes and modifications are possible without departing from the spirit and scope of the invention described herein and will be apparent to those skilled in the art to which it pertains. It is accordingly intended that the present invention shall only be limited by the scope of the claims.

What is claimed is:
1. A compound having the formula

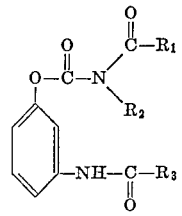

wherein $R_1$ and $R_2$ are independently selected from the group of lower alkyl, mono to tri halogenated lower alkyl, and lower alkenyl; and $R_3$ is selected from the group consisting of hydrogen, lower alkyl, cycloalky having 3 to 6 carbon atoms, inclusive, mono to tri halogenated lower alkyl, lower alkenyl, and benzyl.

2. A compound of claim 1 in which $R_1$ and $R_2$ are each independently lower alkyl and $R_3$ is hydrogen.

3. A compound of claim 2 in which $R_1$ is methyl, and $R_2$ is methyl.

4. A compound of claim 1 in which $R_1$, $R_2$ and $R_3$ are each independently lower alkyl.

5. A compound of claim 4 in which $R_1$ and $R_2$ are each methyl and $R_3$ is ethyl.

6. A compound of claim 4 in which $R_1$ is methyl, $R_2$ is n-butyl and $R_3$ is ethyl.

7. A compound of claim 4 in which $R_1$ is methyl, $R_2$ is isopropyl and $R_3$ is ethyl.

8. A compound of claim 4 in which $R_1$ and $R_2$ are each isopropyl and $R_3$ is ethyl.

9. A compound of claim 1 in which $R_1$ is mono to tri halogenated lower alkyl, $R_2$ and $R_3$ are each independently lower alkyl.

10. A compound of claim 9 in which $R_1$ is trifluoromenthyl, $R_2$ is isopropyl and $R_3$ is ethyl.

11. A compound of claim 9 in which $R_1$ is trifluoromethyl, $R_2$ is n-butyl and $R_3$ is ethyl.

12. A compound of claim 9 in which $R_1$ is trifluoromethyl, $R_2$ is methyl and $R_3$ is ethyl.

13. A compound of claim 9 in which $R_1$ is monochloromethyl, $R_2$ is isopropyl and $R_3$ is ethyl.

14. A compound of claim 9 in which $R_1$ is trichloromethyl, $R_2$ is isopropyl and $R_3$ is ethyl.

References Cited
UNITED STATES PATENTS 1,256,293   2/1918   Callsen _____ 260—479

JAMES A. PATTEN, Primary Examiner

V. GARNER, Assistant Examiner

U.S. Cl. X.R.

71—88, 106, 111; 260—347.4, 468C, 471C, 472; 424—285, 300